Dec. 14, 1965  T. J. SWEENEY  3,222,838
PLASTIC EDGING FOR TRIM STRIP
Filed Oct. 25, 1962
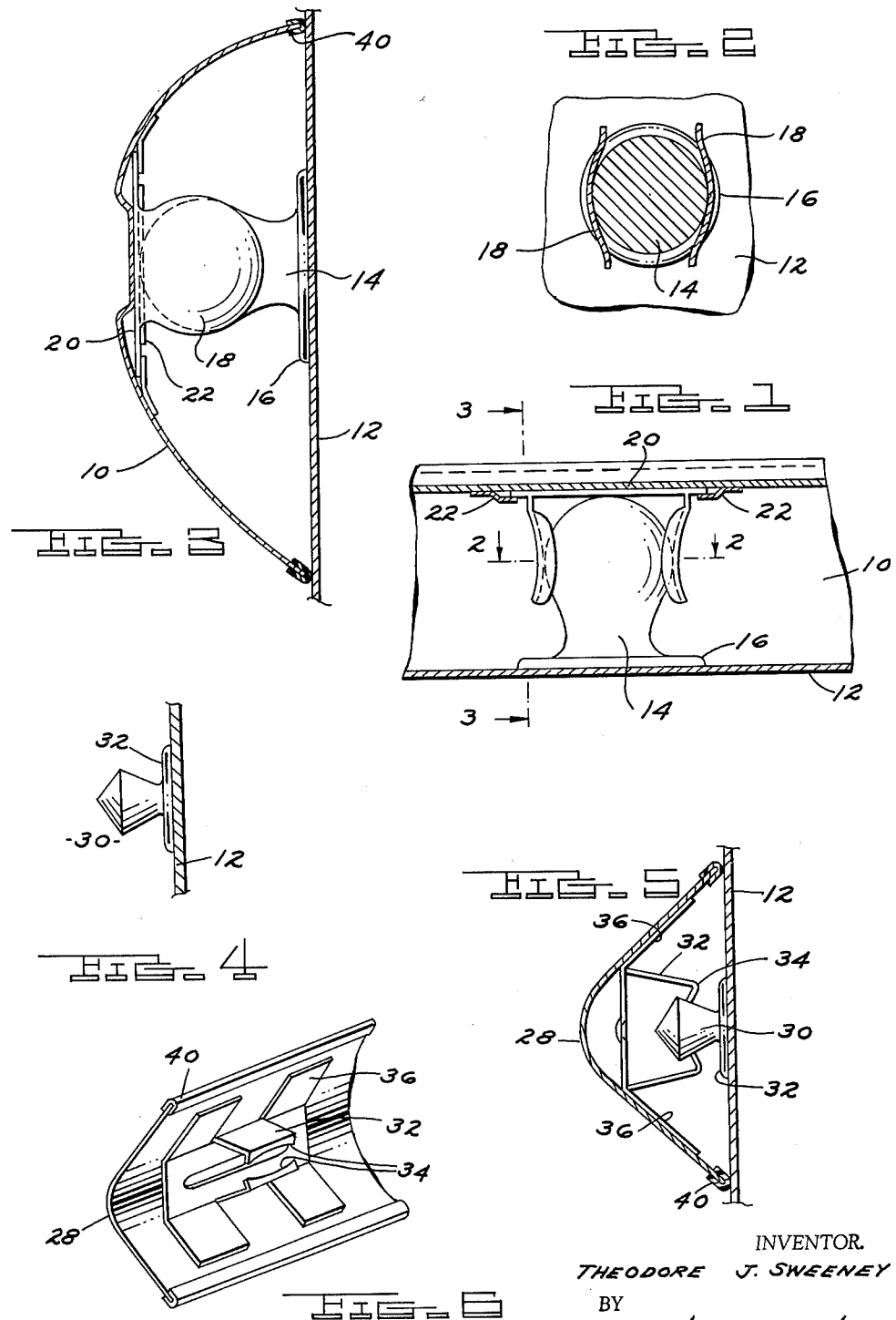
INVENTOR.
THEODORE J. SWEENEY
BY
Burton & Parker
ATTORNEYS United States Patent Office 3,222,838
Patented Dec. 14, 1965

3,222,838
PLASTIC EDGING FOR TRIM STRIP
Theodore J. Sweeney, Grosse Pointe, Mich., assignor to Chicago United Products Company, Inc., Detroit, Mich., a corporation of Michigan
Filed Oct. 25, 1962, Ser. No. 233,047
1 Claim. (Cl. 52—403)

This invention relates to improvements in metal trim parts, strips, or the like which are attached to and overlie the finished surface of an automobile body. It relates to providing such parts so formed and so secured over and to the finished surface of the metal body as to prevent scratching, abrasion or corrosion of the body as the result of attaching such trim parts thereto or use of the body with the trim part attached thereto.

It is current practice in automobile body construction to attach decorative metal pieces, particularly strips such as aluminum or stainless steel to the outer finished surface of automobile bodies. These strips serve the purpose of decoration and may outline different areas of the outer surface of the body wall. Such pieces or strips overlie the painted surface of the body wall and have been secured thereto at spaced points by screws, bolts, clips or the like.

Due to the jar and vibration of travel of the motor vehicle over the road or relative movement of the piece and body wall during attachment of the piece thereto, there is a certain amount of relative movement of the piece with respect to the body wall to which it is attached. The edge of the piece and particularly if it is a cut unrolled edge, may abrade or scratch the painted surface of the body wall.

Furthermore, due to the dis-similarity of metals, that is dis-similarity between the trim piece and the body wall, electrolytic action may set up. As a result the body finish may be worn away, corrosion will develop, and the automobile body will present a disfigured appearance.

An object of this invention is to provide metal trim pieces of such a character and so secured to the body that scratching or abrading of the finished surface of the body by the edge of the piece will not occur, electrolytic action between the piece and the body wall will not be set up, and corrosion from such causes will not result, and therefore the original appearance of the automobile body will be preserved.

More particularly, an object is to provide a metal trim piece of the character described with a smooth weather resistant, friction reducing, nonscratching sealer protective edging which embraces and effectually prevents the edge of the piece from disfiguring or abrading the painted finish of the body wall to which the piece is attached.

A further object is the provision of a metal trim piece with a sealer protective edging which is embracingly secured about an edge of the piece and which edging serves as an insulator between the piece itself and the side wall of the body to which the piece is attached.

More specifically, an object is the provision of a flexible metal trim piece which is concave in cross section and which is adapted to be so attached to the painted surface of an automobile body that the concave side is opposed to the finished surface of the body. The arrangement is such that the metal piece is so secured to the body as to have its edge tensioned resiliently toward the finished surface of the body. The edge of the metal piece, which may be a cut edge presenting a rough abrading edge opposed to the wall of the body, is covered with a plastic insulator or sealer. This insulator is a smooth friction reducing, nonabrading, inert, soft plastic which will not scratch or mar the painted surface of the body wall notwithstanding limited relative movement of the piece over the wall.

Other objects, advantages and meritorious features will more fully appear from the following specification, claim and accompanying drawings, wherein:

FIG. 1 is a cross sectional view through a fragment of a trim piece embodying my invention secured to a portion of an automobile body wall.

FIG. 2 is an elevation of a fragment of an automobile body wall carrying a metal fastener in cross section such as is usable to secure my improved trim piece to the body wall and being taken on the section line 2—2 of FIG. 1.

FIG. 3 is a cross sectional view taken at a right angle to the sectional view of FIG. 1.

FIG. 4 is a cross sectional view through a portion of an automobile body wall showing a form of male fastener secured thereto to cooperate with a female fastener carried by my improved trim piece.

FIG. 5 is a cross sectional view through a trim piece embodying my invention, of a slightly different shape from that shown in FIG. 3, and showing the male fastener of FIG. 4 secured to the automobile body wall and cooperating with a female fastener of somewhat different form from that shown in FIG. 3.

FIG. 6 is a perspective of the female fastener of FIG. 5 showing the same attached to under side of the trim strip.

My invention relates to improvements in a metal trim piece or strip adapted to be secured to the exterior surface of an automobile body wall over the finished outer surface of said wall. More particularly it relates to such a trim piece or strip provided with a protective sealer or insulator edging embracing the edge of the metal piece or strip and bearing directly against the finished surface of the wall thereby being interposed between the edge of the strip and the outer surface of the body wall. The piece itself, together with the edge insulator or sealer fastened thereto is secured to the wall of the body by suitable clips, fasteners or the like.

The clips or fasteners which are shown in the drawing are two piece fasteners such as those that are shown in my application Serial No. 179,128 filed March 12, 1962, and there claimed. They are shown in this case, however, merely to show securement of a trim strip over the exterior painted surface of the metal wall of an automobile body and that the covered edge of the strip or piece is held by the fasteners to bear against the finished exterior surface of the metal wall. The trim piece or strip is tensioned toward the wall by the fasteners or clips which are used for such purpose but has limited shiftability over the finished surface to accommodate for travel of the vehicle over the road and within the play permitted by the fastener elements.

These trim pieces or strips may assume many shapes and forms. As here shown the invention is embodied in a trim strip and fragments of such strip are illustrated. Such fragments are shown in FIGS. 1, 3, 5, and 6. The strips illustrated are somewhat channel shaped in cross section. The side walls terminate in cut edges. The strips are indicated by the numeral 10 and a portion of the side wall of the body by the numeral 12. While the invention here claimed does not relate to the fasteners, they are generally in the form of cooperating male and female fasteners.

In FIGS. 1, 2, and 3 the male fasteners are indicated by the numeral 14. Such fastener has a base portion 16 which is welded or otherwise secured to the side wall 12 of the body. The head of the fastener shown in FIGS. 1, 2, and 3 is so shaped that when received between the opposed spring fingers or jaws 18 of the female fastener of FIGS. 1, 2, and 3, tension is exerted on the head of the fastener tending to draw the trim strip toward the body. The female fastener part which embodies the spring jaws has a base 20. This base 20 is received as shown in FIG. 1 within a bracket 22. This bracket 22 may be welded to the strip 10 as shown in FIGS. 1 and 3. It will be seen from FIG. 1 that the base has permitted play or movement underneath the bracket 22 in the direction linearly of the strip. The two fastener sections have a limited amount of play as between the head of the male fastener and the gripping fingers 18 of the female fastener in the opposite direction, as will be apparent from FIG. 2. FIG. 3 illustrates these same two fastener sections showing the male fastener secured to the side wall of the body and showing the female fastener secured to the trim strip.

FIGS. 5 and 6 show a trim strip indicated as 23. It is of the same general channel shape as heretofore shown except that it is more sharply crowned. Such strip is provided with a different spring fastener element from that shown in FIGS. 1, 2, and 3, but the purpose is the same. The body wall is here indicated as 12 as in FIGS. 1, 2, and 3, and the male fastener is here indicated as 30. Such male fastener has a base 32 that is welded or otherwise secured to the side wall of the body. The head of the fastener is conical rather than dome shaped as shown in FIGS. 1 and 3. The female portion of the fastener includes two opposed spring arms 32 which have inturned ends 34 that engage opposite sloping faces of the male fastener and tend to draw the strip toward the body. The base 36 of the female fastener may be welded as shown to the strip. The construction of this female fastener is more clearly illustrated in FIG. 6.

It will be seen that in both of these constructions the inter-engagement of the male and female fastener elements is such that a tension is exerted tending to hold the edges of the side walls of the strip toward the body wall. As hereinabove stated, these strips are secured to the exterior finished surface of the body wall and the securement is of such a character that a limited amount of shiftable movement between the strip and the body wall may result from travel of the vehicle over the road. The permitted free play between the parts of the fastener permits this limited shiftable movement.

My invention relates specifically to the provision of insulator or sealer edge portions which are received over the metal edges of the strip as shown and are indicated by the numeral 40. These protective edge sealers or insulators may be formed as channel sections adapted to be embracingly received over the metal edges of the strip and extended therealong to provide a smooth tough nonabrasive protective edge portion which bears directly against the finished surface of the body wall. This plastic strip is inert and does not interact in any way with the body wall finish. It is of an insulating character which prevents the setting up of electrolytic action between the metal of the strip and the metal of the body wall. It is softer than the finish on the body wall so that it does not abrade or scratch the same. It facilitates without marring the slight amount of permitted shiftability of the strip over the finished exterior surface of the body wall.

Different plastic compositions may be employed. It has been found that an unplasticized plastic composition is superior. It is also desirable in many cases to use a relatively clear and translucent plastic composition or one at least of a very neutral shade. The plastic should be permanent as to its physical characteristics. It should be tough and wear resistant. It is preferably pliable and very smooth. Plastic compositions of different characters have been found suitable such as the vinyls, polyethylene, polypropylene, butyrates, and nylon may be used.

The channel shaped edge of plastic may be adhesively secured to the edge of the metal strip. It may be of a character to grippingly engage the same. Suitable liquid plastic composition material such as might be spread over the edge of the metal strip and cured thereon or the edge of the metal strip might be dipped in a solution of cellulose acetate butyrate which is then allowed to harden. What is essential is that the plastic edge strip be smooth and inert so that it will ride readily over the finished surface of the body wall and will not attack the same. It should be softer than the finished surface of the body wall so as not to mar or scratch it. It should possess good insulating characteristics all as hereinabove set forth.

While a button type fastener has been herein disclosed for attaching the trim strip to the body panel 12, it should be understood that any suitable fastener may be used.

What I claim is:

In an automobile body a metal trim piece overlying a finished surface of a portion of the body wall and resiliently tensioned thereagainst, said trim piece being of elongated channel shape opening toward the body wall and having longitudinally extending cut abrasive edges opposed to the finished surface of the wall, spring means secured to the inside of the channel-shaped trim piece spaced from said edges and secured to the body wall tensioning the trim piece against the finished surface while allowing limited relative shifting between the trim piece and wall, a weather-resistant, non-abrasive, non-metallic, smooth channel-shaped edge sealer received over and secured to each of said cut longitudinal edges of the trim piece and disposed between the same and the finished surface of the wall holding the edges spaced from the finished surface to insulate them from the finished surface and prevent abrading thereof while allowing relative movement between the edges and such surface, and each edge sealer extending along the inside and outside of the marginal edge only of the trim piece and relatively inconspicuous at the meeting line of the trim piece and finished surface of the automobile body wall.

References Cited by the Examiner

UNITED STATES PATENTS

| | | | |
|---|---|---|---|
| 2,118,800 | 5/1938 | Smith | 189—88 |
| 2,557,660 | 6/1951 | Jacobs | 189—78 |
| 2,963,133 | 12/1960 | MacCallum | 189—88 |
| 3,059,739 | 10/1962 | Cochran | 189—88 |
| 3,103,265 | 9/1963 | Meyer | 189—88 |

OTHER REFERENCES

Engineering Properties and Applications of Plastics: by G. F. Kinney copyright 1957, pp. 7–9 and 27–29, Library Reference: TA, 455 P5K5, C. 2.

FRANK L. ABBOTT, *Primary Examiner.*

HENRY C. SUTHERLAND, *Examiner.*